(12) United States Patent
Stevens (10) Patent No.: US 7,914,040 B1
(45) Date of Patent: Mar. 29, 2011

(54) COLD GAS GENERATING SYSTEM

(75) Inventor: Bruce A. Stevens, Oakland, MI (US)

(73) Assignee: TK Holdings, Inc., Armada, MI (US)

( * ) Notice: Subject to any disclaimer, the term of this patent is extended or adjusted under 35 U.S.C. 154(b) by 325 days.

(21) Appl. No.: 12/150,401

(22) Filed: Apr. 28, 2008

Related U.S. Application Data

(60) Provisional application No. 60/926,456, filed on Apr. 27, 2007.

(51) Int. Cl.
*B60R 21/26* (2006.01)

(52) U.S. Cl. ...... 280/737; 280/736; 280/741; 137/68.13

(58) Field of Classification Search .................. 280/736, 280/737, 741; 137/68.13, 69
See application file for complete search history.

(56) References Cited

U.S. PATENT DOCUMENTS

| | | | | |
|---|---|---|---|---|
| 3,810,655 A | 5/1974 | Prachar | | 280/150 |
| 4,494,963 A | 1/1985 | Reich | | 48/69 |
| 5,474,328 A * | 12/1995 | Nilsson | | 280/737 |
| 5,487,561 A | 1/1996 | Mandzy et al. | | 280/741 |
| 5,582,806 A * | 12/1996 | Skanberg et al. | | 422/305 |
| 5,649,720 A | 7/1997 | Rink et al. | | 280/737 |
| 5,806,886 A | 9/1998 | Ittel et al. | | 280/741 |
| 5,820,162 A * | 10/1998 | Fink | | 280/742 |
| 5,860,443 A * | 1/1999 | Soemer et al. | | 137/69 |
| 5,984,351 A * | 11/1999 | Pierotti et al. | | 280/736 |
| 6,022,045 A * | 2/2000 | Faigle | | 280/736 |
| 6,051,158 A | 4/2000 | Taylor et al. | | 252/67 |
| 6,062,598 A * | 5/2000 | Faigle | | 280/736 |
| 6,076,468 A | 6/2000 | DiGiacomo et al. | | 102/530 |
| 6,131,948 A * | 10/2000 | Cuevas | | 280/737 |
| 6,155,600 A * | 12/2000 | Reynolds et al. | | 280/741 |
| 6,176,518 B1 * | 1/2001 | Faigle | | 280/736 |
| 6,196,583 B1 | 3/2001 | Ruckdeschel et al. | | 280/736 |
| 6,206,420 B1 * | 3/2001 | Skanborg et al. | | 280/737 |
| 6,231,702 B1 | 5/2001 | Blomquist | | 149/36 |
| 6,247,725 B1 * | 6/2001 | Moller | | 280/737 |
| 6,572,141 B2 * | 6/2003 | Nanbu | | 280/736 |
| 6,886,338 B2 * | 5/2005 | Fischer et al. | | 60/632 |
| 6,932,383 B2 | 8/2005 | Flamm | | 280/737 |
| 7,073,820 B2 | 7/2006 | McCormick | | 280/741 |
| 7,134,690 B2 | 11/2006 | Furusawa et al. | | 280/736 |

(Continued)

FOREIGN PATENT DOCUMENTS

GB 2281226 A * 3/1995

*Primary Examiner* — Paul N Dickson
*Assistant Examiner* — Nicole Verley
(74) *Attorney, Agent, or Firm* — L.C. Begin & Associates, PLLC.

(57) ABSTRACT

A gas generating system incorporating a gas flow control mechanism including opposed wall portions defining a cavity for slidably receiving a support member therein. A gas exit passage is exterior of the cavity and in fluid communication with the cavity. An opening in one wall portion enables fluid flow into the cavity. An opening in another wall portion enables a fluid flow from the cavity into the gas exit passage. A seal prevents fluid flow into the cavity when the seal is supported against a force exerted by the fluid. A support member slidably received within the cavity supports the seal against the fluid force. A mechanism is provided for moving the support member from a first position supporting the seal to a second position wherein the seal is unsupported by the support member, enabling failure of the seal and flow of the fluid.

22 Claims, 6 Drawing Sheets

U.S. PATENT DOCUMENTS

| | | | |
|---|---|---|---|
| 7,175,198 B2 * | 2/2007 | Nakayasu et al. | 280/736 |
| 7,178,831 B2 | 2/2007 | Yoshida et al. | 280/741 |
| 7,588,265 B2 | 9/2009 | Blackburn | 280/737 |
| 7,597,354 B2 | 10/2009 | Blackburn | 280/737 |
| 7,658,406 B2 * | 2/2010 | Townsend et al. | 280/737 |
| 7,665,763 B2 * | 2/2010 | Bjorklund et al. | 280/737 |
| 2006/0284402 A1 * | 12/2006 | Schramm et al. | 280/741 |
| 2007/0200326 A1 * | 8/2007 | Nakayasu et al. | 280/736 |
| 2008/0054608 A1 * | 3/2008 | Bito et al. | 280/735 |

* cited by examiner

COLD GAS GENERATING SYSTEM

CROSS-REFERENCE TO RELATED APPLICATION

This application is entitled to and claims the benefit of Provisional Patent Application Ser. No. 60/926,456, filed on Apr. 27, 2007.

BACKGROUND OF THE INVENTION

The embodiments of the present invention shown herein relate generally to systems for controlling a flow of gas used to inflate or actuate a gas-actuatable device.

SUMMARY OF THE INVENTION

In one aspect, a mechanism is provided for releasably blocking a flow of pressurized fluid through an opening. The mechanism includes a housing having a first wall portion and a second wall portion at least partially defining a cavity adapted for slidably receiving a support member therein. A gas exit passage is formed in the housing exterior of the cavity and in fluid communication with the cavity for facilitating flow of pressurized fluid from the housing. An opening is formed in the first wall portion to enable a flow of pressurized fluid into the cavity. Another opening is formed in the second wall portion to enable a flow of pressurized fluid from the cavity into the gas exit passage. A seal is coupled to the housing and is adapted to prevent a flow of fluid through the opening in the first wall portion when the seal is supported against a force exerted by the pressurized fluid in a first direction. A support member is slidably received within the cavity to support the seal against the force exerted by the fluid in the first direction. In addition, a mechanism is operatively coupled to the support member for moving the support member from a first position wherein the seal is supported by the support member, to a second position wherein the seal is unsupported by the support member, thereby enabling failure of the seal and flow of the fluid. The support member slides along the first and second wall portions during movement from the first position to the second position.

In another aspect, a mechanism is provided for releasably blocking a flow of pressurized fluid through an opening. The mechanism includes a housing defining an opening for enabling a flow of pressurized fluid into the housing, and a gas exit passage for facilitating flow of pressurized fluid from the housing. A frangible seal is coupled to the housing and is adapted to prevent a flow of fluid through the housing opening. The seal defines a projection extending into the gas exit passage. The projection includes a wall portion and an end portion coupled to the wall portion. In addition, a mechanism is operatively coupled to the housing for producing a failure of the seal along the wall portion of the seal, thereby enabling flow of the fluid through the opening.

In yet another aspect, a mechanism is provided for sealing a container containing an amount of pressurized fluid therein. The mechanism includes a rupturable member coupled to the container for blocking a flow of fluid from the container past the rupturable member, and a mechanism coupled to the container for rupturing the rupturable member. After rupture of the rupturable member, a first portion of the rupturable member detaches from a second portion of the rupturable member, thereby permitting flow of fluid from the container past the second portion of the rupturable member.

DETAILED DESCRIPTION

FIGS. 1-9 show various embodiments of a mechanism for releasably blocking a flow of fluid. FIGS. 1-4 show a first embodiment 10 of the mechanism. In the embodiment shown, mechanism 10 is shown secured to a pressurized fluid storage container 18 (for example, a gas bottle or tank) which is incorporated into a gas generating system, generally designated 8. The pressurized fluid in container 18 may comprise a gas or a liquid which vaporizes when the pressure in the container is reduced (for example, by providing an opening permitting flow of the fluid out of the container). In the embodiment shown, mechanism 10 prevents a flow of fluid from the container 18 through a housing 12 attached to the container prior to activation of the gas generating system.

Referring to FIGS. 1-4, housing 12 includes a first wall portion 12a and a second wall portion 12b at least partially defining a cavity 24, and a gas exit passage 25 exterior of cavity 24 for accommodating a flow of pressurized fluid therethrough after activation of the gas generating system. In the embodiment shown, the first and second wall portions 12a and 12b are opposed wall portions partially defining a generally cylindrical cavity 24. However, the wall portions forming at least a portion of support member cavity 24 could alternatively be adjacent or otherwise arranged with respect to each other.

Cavity 24 is adapted for slidably receiving a support member 29 therein, in a manner described in greater detail below. Wall portions 12a and 12b act to guide support member 29 during movement of the member from a first, supporting position (shown in FIG. 3) within the cavity to a second, non-supporting position (shown in FIG. 4) within the cavity, as described below. It will be understood that a "supporting position" of the support member is any position in which the support member provides sufficient support to the seal to prevent failure of the seal. In this context, the seal is considered to have failed when the seal no longer blocks or prevents a flow of fluid.

Passage 25 is in fluid communication with cavity 24 and facilitates flow of pressurized fluid from the housing. An opening 12c is formed in first wall portion 12a to enable a flow of pressurized fluid into cavity 24. An opening 12d is formed in second wall portion 12b to enable a flow of pressurized fluid from cavity 24 into gas exit passage 25. An axis L extends longitudinally and centrally through housing 12. In the embodiment shown in FIGS. 1-4, the first and second openings 12c, 12d are aligned along axis L. Alternatively, the first and second openings may lie along spaced apart and/or non-parallel axes, depending on the requirements of a particular application. In addition, a vent hole 31 is formed in the housing for venting any fluid displaced by movement of support member 29, as described below.

Figure 1:
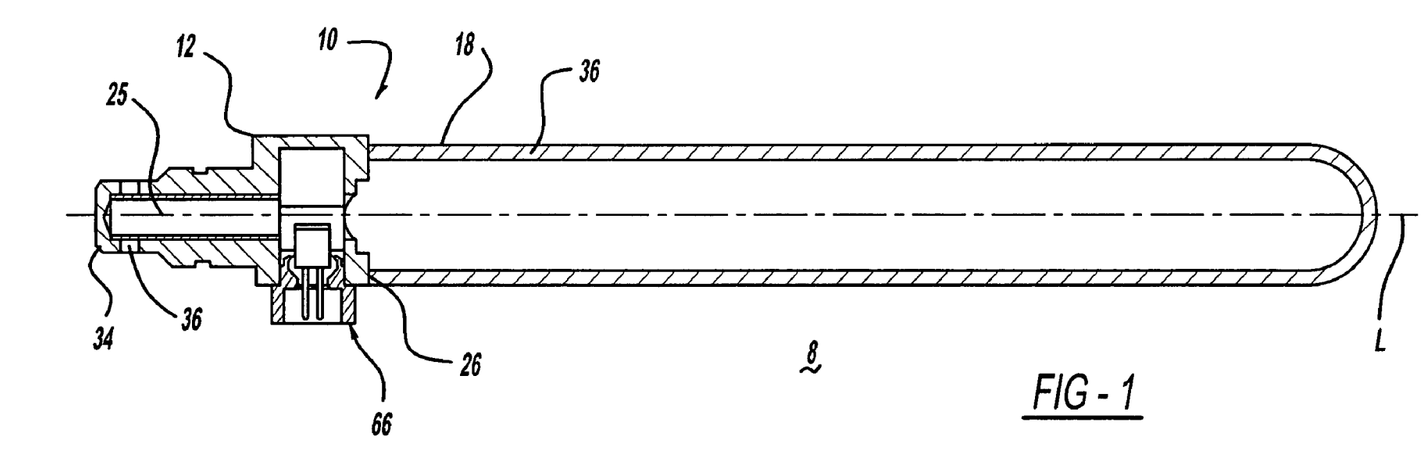
FIG. 1 is a cross-sectional side view of a gas generating system in accordance with a first embodiment of the present invention.
Figure 2:
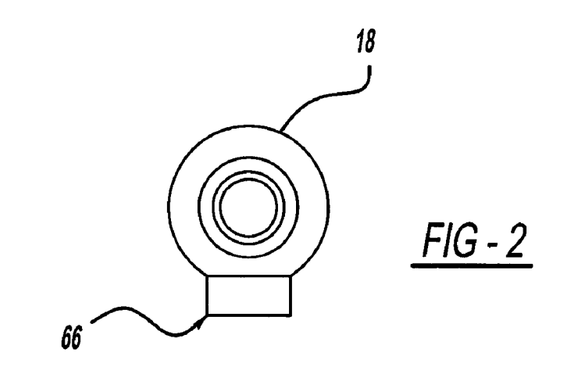
FIG. 2 is an end view of the gas generating system of FIG. 1.
Figure 3:
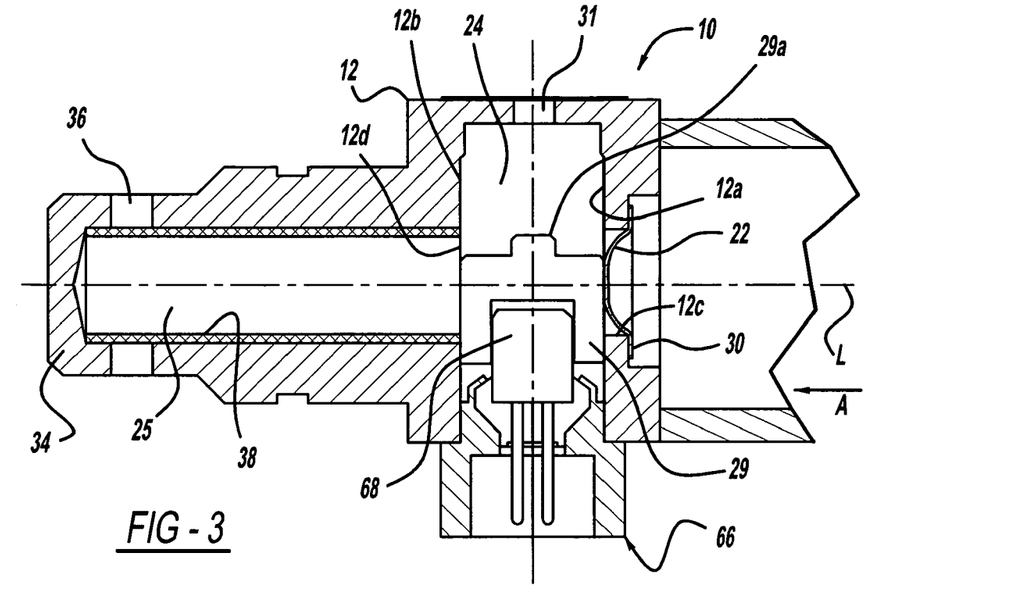
FIG. 3 is a cross-sectional side view of a portion of the gas generating system of FIG. 1 prior to system activation.
Figure 4:
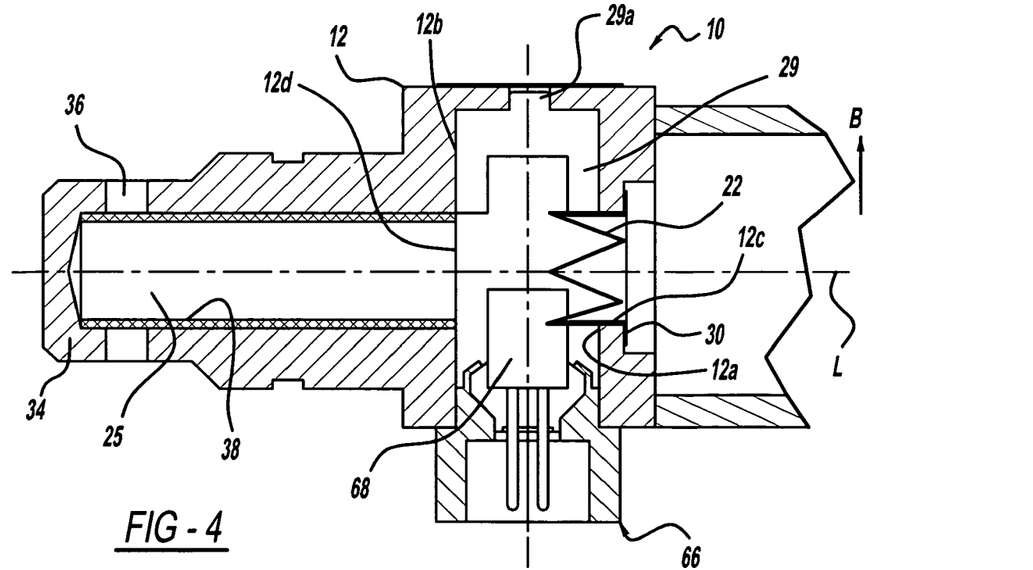
FIG. 4 is the cross-sectional side view of the portion of the gas generating system shown in FIG. 3 after system activation.

In a particular embodiment, a portion of the housing is dimensioned so as to form an interference fit with support member 29, to trap and retain the support member therein when the support member moves to the position within housing cavity shown in FIG. 4. In one embodiment (shown in FIGS. 3 and 4), an upper portion of support member 29 is provided with a projection 29a and vent hole 31 is dimensioned to receive projection 29a therein and to form an interference fit with the projection, to retain the support member in a location substantially out of the path of a gas flow entering housing 12 through failed seal 22. Alternatively, one or more walls of the housing defining an upper portion of cavity 24 may be dimensioned relative to an outermost dimension of the support member so as to form the interference fit when the support member enters the upper portion of the cavity. In the embodiment shown in FIGS. 1-4, housing 12 also includes an annular shoulder 30 extending from an edge of opening 28, along which seal 22 is secured.

In the embodiment shown in FIGS. 1-4, housing 12 also contains a hollow diffuser portion 34 in fluid communication with gas exit passage 25. Diffuser portion 34 may be formed integrally with housing 12. Alternatively, diffuser portion 34 may be machined or otherwise formed from steel or other suitable materials, and then welded or otherwise fixed to housing 12. Diffuser 34 functions to distribute gas flowing from housing first end 20 through passage 25 to an exterior of the gas generating system. A plurality of gas discharge orifices 36 is spaced about a circumference of the diffuser.

A filter 38 may be incorporated into the housing to filter combustion products and/or particulates from the fluid prior to distribution. Any suitable metallic mesh filter or woven wire cloth may be used, many examples of which are known and obtainable from commercially available sources (for example, Wayne Wire Cloth Products, Inc. of Bloomfield Hills, Mich.)

Housing 12 may be cast, machined or otherwise formed from steel or other suitable metals or metal alloys. Alternatively, housing 12 (or portions thereof) may be molded from a suitable polymer material. In addition, housing 12 may be fabricated from component pieces which are formed individually and then suitably secured to each other, for example, by welding or adhesive application.

Referring again to FIGS. 1-4, seal 22 is coupled to housing 12 and is adapted to prevent a flow of fluid through opening 12c in first wall portion 12a when the seal is supported against a force exerted by the pressurized fluid in a first direction indicated by arrow "A" in FIG. 3. Seal 22 is also in fluid communication with an interior of container 18. Seal 22 forms a fluid-tight barrier preventing flow of pressurized gas through or around the seal when the seal is supported by support member 29 residing in a first position as shown in FIG. 3.

In the embodiment shown in FIGS. 1-4, seal 22 is seated along annular shoulder 30 of housing opening 28. The seal is welded or otherwise secured along housing shoulder 30 to obstruct flow of the pressurized fluid during normal vehicular operation. Alternatively, the seal could be seated along, and secured to another portion of the housing or to a portion of container 18, if desired. Seal 22 is also configured to be rupturable or to otherwise fail in response to pressure exerted by the fluid when not externally supported against this pressure by support member 29.

In the embodiment shown in FIGS. 1-4, the seal is formed by a rupturable member (for example, a burst disk) positioned over opening 12c, and support of rupturable member by support member 29 prevents rupture of the rupturable member. Rupturable member 22 may be stamped or otherwise suitably formed from any of various foils, films, or other suitable materials as is known in the art. The materials and structure of the seal will depend on the pressure of the fluid sealed in bottle 18 and the desired performance characteristics of the gas generating system. For example, seals made from materials and/or having structures which are relatively more or less readily ruptured may be used.

In an embodiment where the seal is formed by a rupturable member, a portion of the rupturable member may be scored or otherwise structurally impaired in a manner known in the art, so as to facilitate rupturing or failure of the seal upon movement of the support member out of its supporting position.

Referring again to FIGS. 1-4, support member 29 is slidably received within cavity 24 to support seal 22 against the force exerted by the pressurized fluid in direction "A", thereby preventing pressurized fluid in bottle 18 from rupturing seal 22 or otherwise producing failure of the seal during normal vehicular operation. As used herein, the term "support member" is understood to mean an element or a portion of an element which supports the seal and which is movable from a first, supporting position (FIG. 3) to a second, non-supporting position (FIG. 4) in which the seal is unsupported by the support member, thereby enabling failure of the seal and flow of the fluid into opening 12c in first wall portion 12a. In the embodiment shown in FIGS. 1-4, support member 29 directly supports the seal (i.e., the support member is in direct contact with the seal). Alternatively, the support member may support the seal by abutting or otherwise supporting another member positioned intermediate the support member and the seal.

Referring to FIGS. 3 and 4, after activation of the gas generating system, support member 29 slides along seal 22 during movement from the first position to the second position. Also, after activation of the gas generating system, support member 29 slides over opening 12c in first wall portion 12a when moving from the first position to the second position. In addition, after activation of the gas generating system, support member 29 slides over opening 12d in second wall portion 12b when moving from the first position to the second position. Support member 29 may be formed from a suitable metallic or polymeric material.

Referring again to FIGS. 3 and 4, a mechanism is coupled to support member 29 for moving the support member from the first position to the second position. In one embodiment, the mechanism for moving the support member comprises a source of pressurized gas positioned so as to provide pressurized gas to impinge upon the support member to move the support member from the first position to the second position after activation of the moving mechanism. In the particular embodiment shown in FIGS. 1-4, the source of pressurized gas is an initiator 68 mounted in an initiator assembly 66. Initiator assembly 66 is positioned in relation to housing 12 so as to enable fluid communication between the initiator and support member 29 upon activation of the gas generating system. In the embodiment shown, initiator assembly 66 is crimped or otherwise suitably secured to housing 12 and extends through a wall of the housing so that, upon activation of the initiator assembly, initiator 68 is in fluid communication with passage 24. In addition, it may be seen from FIGS. 1-4 that seal 22 and support member 29 lay along a common axis L extending through the housing. It may also be seen that initiator 68 is spaced apart from axis L. Stated another way, in the embodiment shown, initiator 68 does not intersect axis L along which seal 22 and support member 28 are positioned. As used herein, the term "axis" is understood to designate a line in relation to which parts of a structure or body may be referenced. Initiator 68 may be formed as known in the art. Exemplary initiator constructions are described in U.S. Pat. Nos. 6,009,809 and 5,934,705, incorporated herein by reference. Initiator 68 may be secured within initiator assembly 66 by any one of a variety of methods, for instance using welds, adhesives, by crimping, or by integrally molding the igniter into a portion of the initiator assembly.

In the embodiment shown in FIGS. 1-4, initiator assembly 66 is located such that support member 29 may be mounted on or positioned atop a portion of the initiator assembly in a sliding fit or a slight interference fit. In this position, the support member also supports seal 22 to prevent the seal from failing. In a manner described in greater detail below, activation of the initiator assembly causes support member 29 to be propelled in the direction indicated by arrow "B", from the first ("supporting") position to the second ("non-supporting") position.

Figure 5:
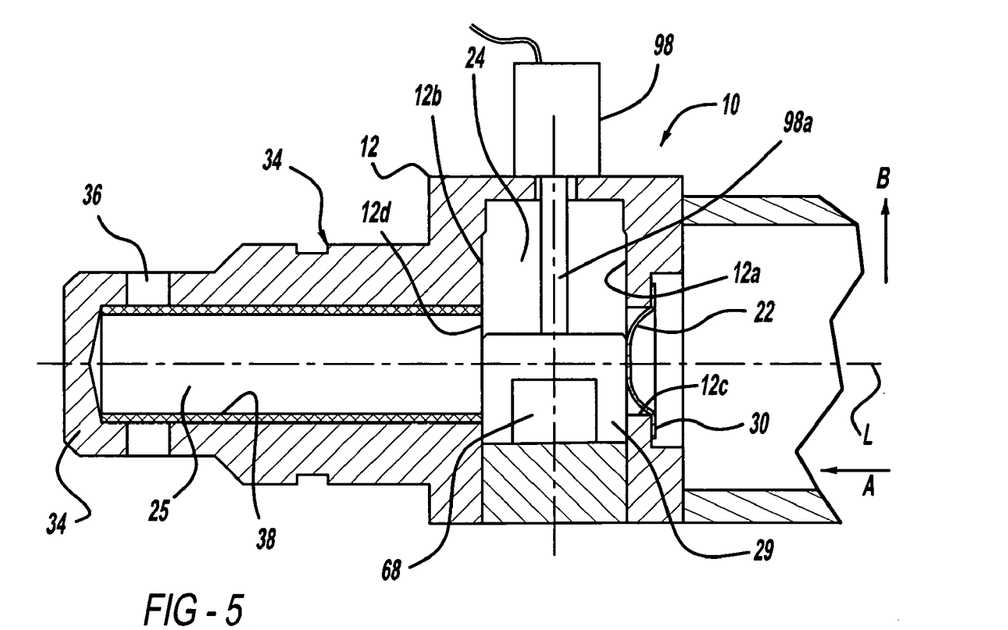
FIG. 5 is a cross-sectional side view of a portion of a gas generating system in accordance with a second embodiment of the present invention.

Referring now to FIG. 5, in an alternative embodiment, the mechanism for moving the support member comprises a solenoid 98. As seen in FIG. 5, the support member 29 is coupled to a plunger 98a of the solenoid so as to move in conjunction with the plunger. Activation of solenoid 98 causes the plunger 98a to move in the direction indicated by arrow "B", thereby withdrawing support for the seal and enabling failure of the seal. In another alternative embodiment (not shown), the plunger of the solenoid forms the support member.

Figure 6:
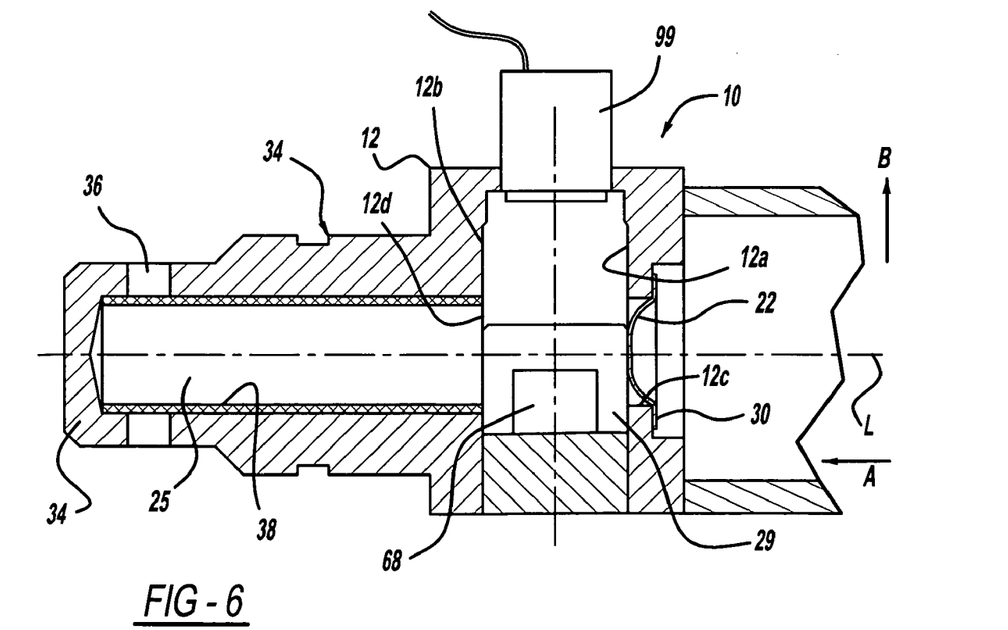
FIG. 6 is a cross-sectional side view of a portion of a gas generating system in accordance with a third embodiment of the present invention.

Referring to FIG. 6, in another alternative embodiment, the support member is formed from a magnetic material, and the mechanism for moving the support member includes an electro-magnet 99 positioned for exerting a force on the support member to produce movement of the support member in the direction indicated by arrow "B", from the first position to the second position. As used herein, the term "magnetic material" is understood to refer to materials which are capable of being magnetized or attracted by a magnet.

Other mechanisms for moving the support member from the first position to the second position are also contemplated. For example, pressurized gas from a source located in a different portion of the vehicle could be shunted to cavity 24 to produce movement of support member 29 as described. Alternatively, the support member could be spring-loaded to move as described when released from a latching mechanism controlled by an electronically or mechanically-actuated inertial switch. In another example, the crumpling of a vehicle body member upon collision could either trigger actuation of a switch to release a spring-loaded support member, or compress a bladder whose interior is in fluid communication, with the support member, thereby pressurizing a fluid contained within the bladder to produce movement of the support member. Other mechanisms are also possible.

Operation of the embodiment shown in FIGS. 1-4 will now be discussed.

Upon occurrence of a crash event, initiator 68 receives an activation signal from a crash sensor or accelerometer (not shown), for example. Combustion of the initiator charge produces an increase in pressure within cavity 24 on the side of support member 29 facing the initiator, causing the support member to slide upwards within cavity 24 (in the direction indicated by arrow "B" in FIG. 4) along the first and second wall portions 12a and 12b and along a surface of seal 22. As support member 29 approaches an end portion of 24 opposite initiator 68, gases trapped within cavity 24 between support member 29 and the end portion of the cavity are vented through hole 31. Also, the support member disengages from seal 22, at which point the support member no longer supports seal 22. Without the support of member 29, seal 22 ruptures due to the internal fluid pressure within storage container 18, releasing stored fluid into cavity 24. The fluid flows through cavity 24, into and along gas exit passage 25 and out of diffuser portion 34 into an airbag or other associated inflatable element (not shown). Filter 38 in diffuser 34 traps any particulates or debris to prevent their entry into the inflatable element.

Operation of the embodiments shown in FIGS. 5 and 6 is substantially the same as described above. Upon occurrence of a crash event, solenoid 98 (FIG. 5) or electromagnet 99 (FIG. 6) receive an activation signal from a crash sensor or accelerometer (not shown). Energization of the solenoid or electromagnet produces motion of the solenoid plunger (FIG. 5) or the magnetic support member 29 (FIG. 6) in the direction indicated by arrow "B", thereby removing support for seal 22. Without the support of member 29, seal 22 ruptures due to the internal fluid pressure within storage container 18, releasing stored fluid into passage 25 as described previously.

Figure 7:
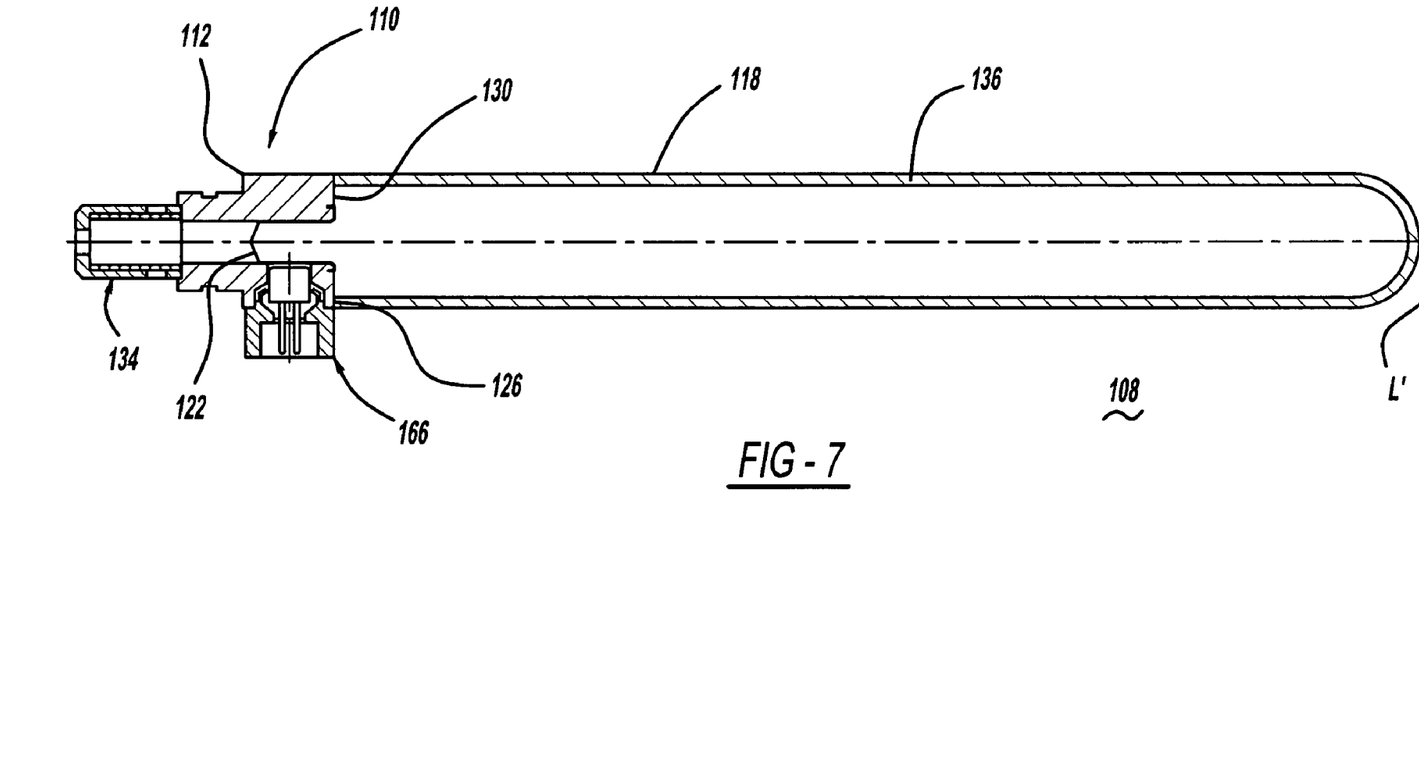
FIG. 7 is a cross-sectional side view of a gas generating system in accordance with a fourth embodiment of the present invention.
Figure 8:
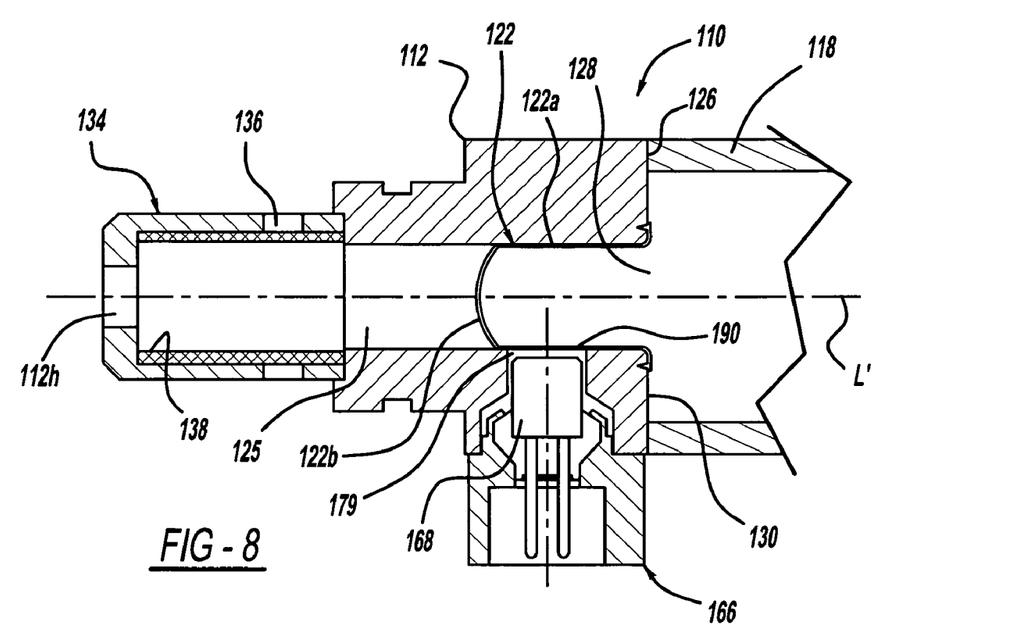
FIG. 8 is a cross-sectional view of a portion of the gas generating system of FIG. 7 prior to system activation.
Figure 9:
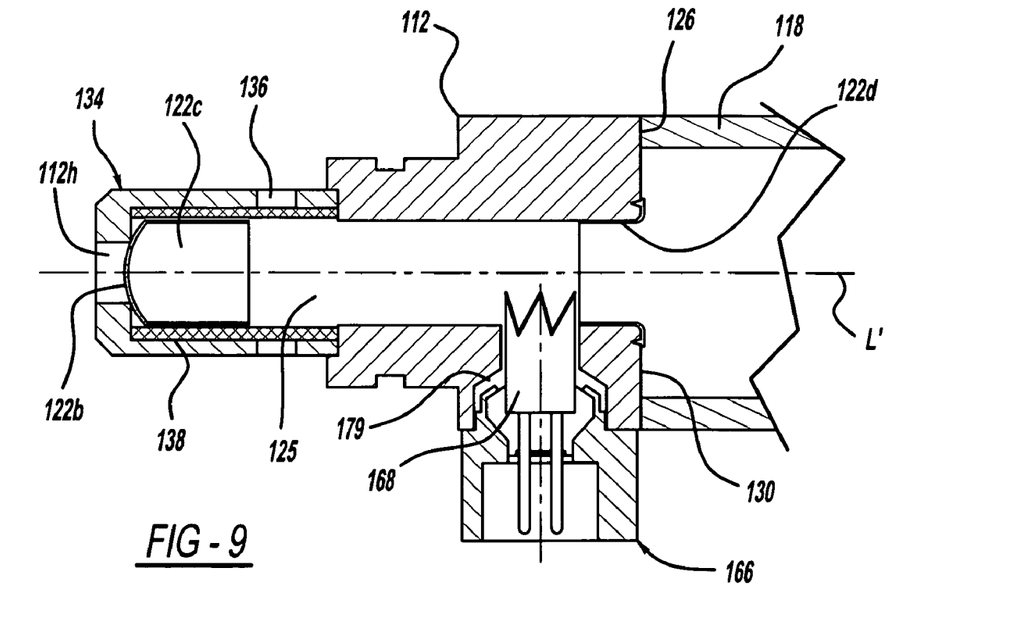
FIG. 9 is a cross-sectional view of the portion of the gas generating system shown in FIG. 7 after system activation.

FIGS. 7-9 show yet another embodiment of a mechanism for releasably blocking a flow of fluid through an opening. The mechanism 110 in FIGS. 7-9 is shown secured to a pressurized fluid storage container 118 (in the embodiment shown, a gas bottle or tank) which is incorporated into a gas generating system, generally designated 108. As in the previously described embodiments, the pressurized fluid in container 118 may comprise a gas or a liquid which vaporizes when the pressure in the container is reduced (for example, by providing an opening permitting flow of the fluid out of the container). In the embodiment shown, mechanism 110 prevents a flow of fluid from the container 118 through a housing 112 prior to activation of the gas generating system. Container 118 has an annular wall defining an opening having an annular edge 126 extending therealong.

Mechanism 110 includes a housing 112 defining an opening 128 for enabling a flow of pressurized fluid into the housing, and a gas exit passage 125 for facilitating flow of pressurized fluid from the housing after activation of the gas generating system. Opening 128 includes an edge 130. A longitudinal axis L' extends longitudinally and centrally through housing 112. In the embodiment shown in FIGS. 7-9, housing 112 also contains a hollow diffuser portion 134 in fluid communication with gas exit passage 125. Diffuser portion 134 may be formed integrally with housing 112. Alternatively, diffuser portion 134 may be machined or otherwise formed from steel or other suitable materials, and then welded or otherwise fixed to housing 112. Diffuser 134 functions to distribute gas received from passage 125 to an exterior of the gas generating system. A plurality of gas discharge orifices 136 is spaced about a circumference of the diffuser. The diffuser may incorporate a filter 138 therein to filter combustion products from the inflation fluid prior to gas distribution. Any suitable metallic mesh filter or woven wire cloth may be used, many examples of which are known and obtainable from commercially available sources (for example, Wayne Wire Cloth Products, Inc. of Bloomfield Hills, Mich.)

Housing 112 may include a vent hole 112h for venting a gas displaced within the gas exit passage by movement of a piece of a seal 122 (described below) after failure of the seal in a manner described in greater detail below. Housing 112 also includes a cavity 179 in fluid communication with gas exit passage 125 for the mounting of an initiator assembly 166 (described below) or other seal rupturing device therein.

Housing 112 may be cast, machined or otherwise formed from steel or other suitable metals or metal alloys. Alternatively, housing 112 may be molded from a suitable polymer material. In addition, housing 112 may be fabricated from component pieces which are formed individually and then suitably secured to each other, for example, by welding.

Referring to FIGS. 5-7, mechanism 110 includes a frangible seal 122 secured in fluid communication with an interior of bottle 118. Seal 122 forms a fluid-tight barrier preventing flow of pressurized gas through or around the seal. In the embodiment shown in FIGS. 5-7, seal 122 is welded or otherwise secured along annular housing opening edge 130 to obstruct flow of the pressurized fluid during normal vehicular operation. Seal 122 defines a projection extending into the gas exit passage and including a wall portion 122a and an end portion 122b coupled to the wall portion.

Seal 122 may be formed from any of various membranes, foils, films, etc., as is known in the art. The materials and structure of the seal will depend on the pressure of the gas sealed in bottle 118 and the desired performance characteristics of gas generating system 108. For example, seals made from materials and/or having structures which are relatively more or less readily ruptured may be used.

The seal in the embodiment shown in FIGS. 7-9 is designed to separate into more than one piece after failure. In a particular embodiment, seal 122 is designed to separate along the wall portion of the seal into a first piece 122c and a second piece 122d after failure, thereby enabling a flow of pressurized fluid through opening 128. One or more scores or notches (not shown) may be formed along seal wall portion 122a to weaken the structure of the seal in predetermined areas, thereby facilitating rupture of the seal in these predetermined areas by a load applied to an exterior of the seal. In addition, in the embodiment shown in FIGS. 7-9, seal wall portion 122a extends along a wall of gas exit passage 125.

Referring again to FIGS. 7-9, a mechanism is coupled to the housing for producing a failure of seal 122 along wall portion 122a, thereby enabling flow of the fluid through the opening. In the embodiment shown in FIGS. 7-9, the mechanism for producing failure of the seal is an initiator assembly 166 is positioned in relation to housing 112 so as to enable fluid communication between an initiator 168 incorporated into the assembly and seal 122 upon activation of the gas generator. In the embodiment shown, initiator assembly 166 is crimped or otherwise suitably secured to housing 112 and extends through a wall of the housing so that, upon activation of initiator assembly 166, the initiator assembly is in fluid communication with passage 125 and seal 122. It may also be seen that initiator 168 is spaced apart from axis L'. Stated another way, in the embodiment shown, initiator 168 does not intersect axis L' along which seal 122 is positioned. As used herein, the term "axis" is understood to designate a line in relation to which parts of a structure or body may be referenced. In the embodiment shown in FIGS. 7-9, initiator 168 is mounted within cavity 179 so as to project a flow of initiator combustion products into wall portion 122a of seal 122 after activation of the initiator, thereby causing rupture of the seal along wall portion 122a. Initiator 168 may be formed as known in the art. Exemplary initiator constructions are described in U.S. Pat. Nos. 6,009,809 and 5,934,705, incorporated herein by reference. Initiator 168 may be secured within initiator assembly 166 by any one of a variety of methods, for instance using welds, adhesives, by crimping, or by integrally molding the igniter into a portion of the initiator assembly.

Operation of mechanism 110 will now be discussed.

Upon occurrence of a crash event, initiator 168 receives an activation signal from a crash sensor or accelerometer (not shown), for example. Combustion of the initiator charge produces an increase in pressure along the outer surface of seal 122, causing the seal to rupture along any scores formed along seal wall portion 122a. The resulting weakening of the seal facilitates rupture of the remainder of the seal in these predetermined areas under pressure exerted by the fluid stored in container 118, causing the seal to separate into at least a first portion 122c and a second portion 122d, as shown in FIG. 9. Seal portion 122c is forced into diffuser 134, where it is trapped. Fluid is released from storage container 118 to flow through passage 125 and out of diffuser portion 134 into an airbag or other associated inflatable element (not shown). Filter 138 in diffuser 134 traps any particulates or debris to prevent their entry into the inflatable element.

Figure 10:
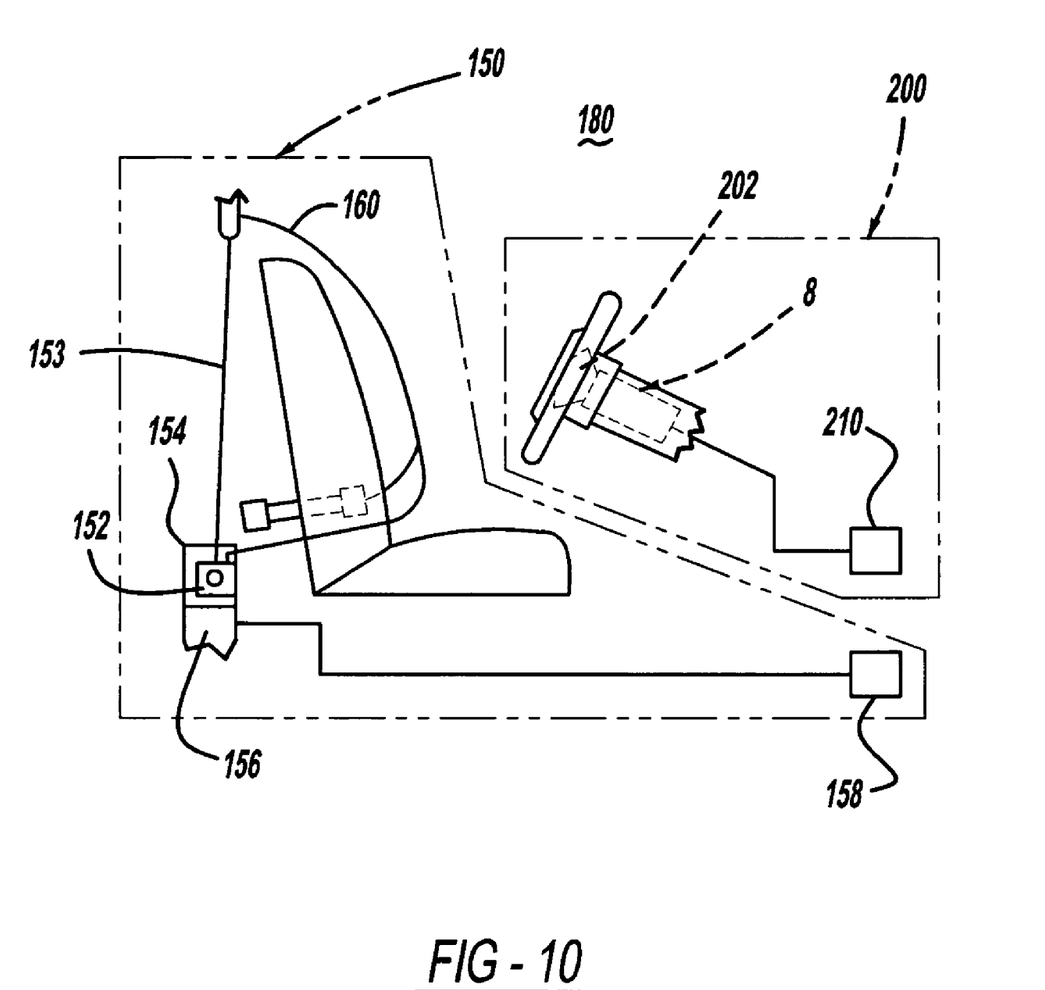
FIG. 10 is a schematic view of an airbag system and a vehicle occupant restraint system incorporating a gas generating system in accordance with the present invention.

Any embodiment of the gas generating system described herein may be incorporated into an airbag system 200, as seen in FIG. 10. Airbag system 200 includes at least one airbag 202 and a gas generating system 8, 108 as previously described coupled to airbag 202 so as to enable fluid communication with an interior of the airbag. Airbag system 200 may also include (or be in operative communication with) a crash event sensor 210 including a known crash sensor algorithm that signals actuation of airbag system 200 via, for example, activation of airbag igniter 68, 168 (not shown in FIG. 10) in the event of a collision.

Referring again to FIG. 10, an embodiment of the gas generating system or an airbag system including an embodiment of the gas generating system may be incorporated into a broader, more comprehensive vehicle occupant restraint system 180 including additional elements such as a safety belt assembly 150. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical safety belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may also include (or be in operative communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of various embodiments of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A mechanism for releasably blocking a flow of pressurized fluid through an opening, the mechanism comprising:
   a housing including a first wall portion and a second wall portion at least partially defining a cavity adapted for slidably receiving a support member therein, and a gas exit passage exterior of the cavity and in fluid communication with the cavity for facilitating flow of pressurized fluid from the housing;
   an opening in the first wall portion to enable a flow of pressurized fluid into the cavity;
   an opening in the second wall portion to enable a flow of pressurized fluid from the cavity into the gas exit passage;
   a seal coupled to the housing and adapted to prevent a flow of fluid through the opening in the first wall portion when the seal is supported against a force exerted by the pressurized fluid in a first direction;
   a support member slidably received within the cavity to support the seal against the force exerted by the fluid in the first direction; and
   means operatively coupled to the support member for moving the support member from a first position wherein the seal is supported by the support member, to a second position wherein the seal is unsupported by the support member, thereby enabling failure of the seal and flow of the fluid,
   wherein the support member slides along the first and second wall portions during movement from the first position to the second position.

2. The mechanism of claim 1 wherein the support member slides along the seal during movement from the first position to the second position.

3. The mechanism of claim 1 wherein the support member slides over the opening in the first wall portion when moving from the first position to the second position.

4. The mechanism of claim 3 wherein the support member slides over the opening in the second wall portion when moving from the first position to the second position.

5. The mechanism of claim 1 wherein the support member slides over the opening in the second wall portion when moving from the first position to the second position.

6. The mechanism of claim 1 wherein the seal comprises a rupturable member positioned over the first opening, and wherein support of the rupturable member by the support member prevents rupture of the rupturable member.

7. The mechanism of claim 1 wherein the means for moving the support member comprises a source of pressurized gas positioned so as to provide pressurized gas to impinge upon the support member to move the support member from the first position to the second position after activation of the moving means.

8. The mechanism of claim 7 wherein the source of pressurized gas comprises an initiator.

9. The mechanism of claim 8 wherein the support member is mounted on the initiator prior to activation of the initiator.

10. The mechanism of claim of claim 1 wherein the means for moving the support member comprises a solenoid and wherein the support member is coupled to a plunger of the solenoid so as to move in conjunction with the plunger.

11. The mechanism of claim 1 wherein the means for moving the support member comprises a solenoid and wherein a plunger of the solenoid forms the support member.

12. The mechanism of claim 1 wherein the support member is formed from a magnetic material, and wherein the means for moving the support member comprises an electromagnet positioned for exerting a force on the support member to produce movement of the support member from the first position to the second position.

13. The mechanism of claim 1 wherein the housing includes a vent hole 66 formed therein for venting a fluid displaced by movement of the support member within the housing.

14. The mechanism of claim 13 wherein the vent hole vents a fluid displaced by movement of the support member from the first position to the second position.

15. A gas generating system comprising a mechanism in accordance with claim 1.

16. A vehicle occupant protection system including a mechanism in accordance with claim 1.

17. The mechanism of claim 1 wherein a portion of the cavity is dimensioned so as to form an interference fit with the support member to retain the support member therein when the support member moves to the second position.

18. The mechanism of claim 1 wherein the support member is configured so as to not rupture the seal during movement of the support member within the housing.

19. A mechanism for releasably blocking a flow of pressurized fluid through an opening, the mechanism comprising:
   a housing including a first wall portion and a second wall portion at least partially defining a cavity adapted for slidably receiving a support member therein, and a gas exit passage exterior of the cavity and in fluid communication with the cavity for facilitating flow of pressurized fluid from the housing;
   an opening in the first wall portion to enable a flow of pressurized fluid into the cavity;
   an opening in the second wall portion to enable a flow of pressurized fluid from the cavity into the gas exit passage;
   a seal coupled to the housing and adapted to prevent a flow of fluid through the opening in the first wall portion when the seal is supported against a force exerted by the pressurized fluid in a first direction;
   a support member slidably received within the cavity to support the seal against the force exerted by the fluid in the first direction; and
   a source of pressurized gas positioned so as to provide pressurized gas to impinge upon the support member, for moving the support member from a first position wherein the seal is supported by the support member, to a second position wherein the seal is unsupported by the support member, thereby enabling failure of the seal and flow of the fluid,
   wherein the support member slides along the first and second wall portions during movement from the first position to the second position.

20. The mechanism of claim 19 wherein the support member is configured so as to not rupture the seal during movement of the support member within the housing.

21. A mechanism for releasably blocking a flow of pressurized fluid through an opening, the mechanism comprising:
   a housing including a first wall portion and a second wall portion at least partially defining a cavity adapted for slidably receiving a support member therein, and a gas exit passage exterior of the cavity and in fluid communication with the cavity for facilitating flow of pressurized fluid from the housing;
   an opening in the first wall portion to enable a flow of pressurized fluid into the cavity;

an opening in the second wall portion to enable a flow of pressurized fluid from the cavity into the gas exit passage;

a seal coupled to the housing and adapted to prevent a flow of fluid through the opening in the first wall portion when the seal is supported against a force exerted by the pressurized fluid in a first direction;

a support member slidably received within the cavity to support the seal against the force exerted by the fluid in the first direction; and means operatively coupled to the support member for moving the support member from a first position wherein the seal is supported by the support member, to a second position wherein the seal is unsupported by the support member, thereby enabling failure of the seal and flow of the fluid, wherein the support member slides along the first and second wall portions during movement from the first position to the second position, and wherein the first and second wall portions are opposed wall portions.

22. A mechanism for releasably blocking a flow of pressurized fluid through an opening, the mechanism comprising:

a housing including a first wall portion and a second wall portion at least partially defining a cavity adapted for slidably receiving a support member therein, and a gas exit passage exterior of the cavity and in fluid communication with the cavity for facilitating flow of pressurized fluid from the housing;

an opening in the first wall portion to enable a flow of pressurized fluid into the cavity;

an opening in the second wall portion to enable a flow of pressurized fluid from the cavity into the gas exit passage;

a seal coupled to the housing and adapted to prevent a flow of fluid through the opening in the first wall portion when the seal is supported against a force exerted by the pressurized fluid in a first direction;

a support member slidably received within the cavity to support the seal against the force exerted by the fluid in the first direction; and means operatively coupled to the support member for moving the support member from a first position wherein the seal is supported by the support member, to a second position wherein the seal is unsupported by the support member, thereby enabling failure of the seal and flow of the fluid, wherein the support member slides along the first and second wall portions during movement from the first position to the second position, and wherein the opening in the first wall portion is aligned with the opening in the second wall portion along an axis.

* * * * *